Aug. 29, 1961 — J. M. OLLER — 2,998,038
MULTI-SURFACE PLANING MACHINE
Filed Jan. 5, 1959 — 2 Sheets-Sheet 2
Fig. 5
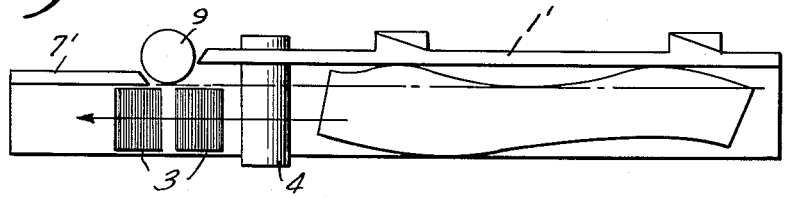
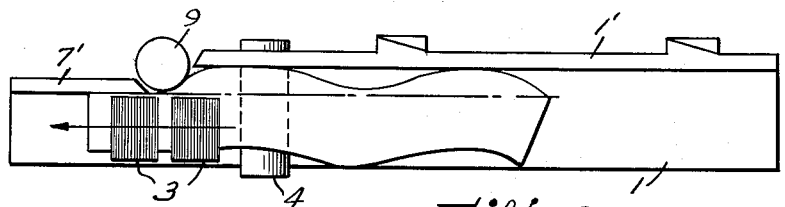
Fig. 6
Fig. 7
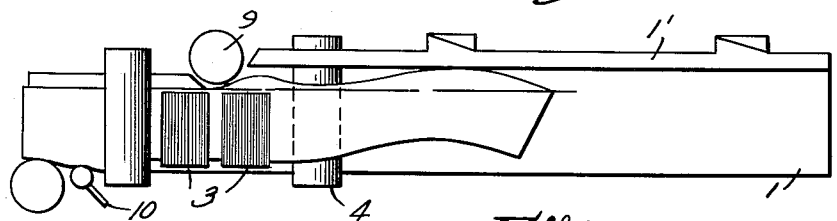
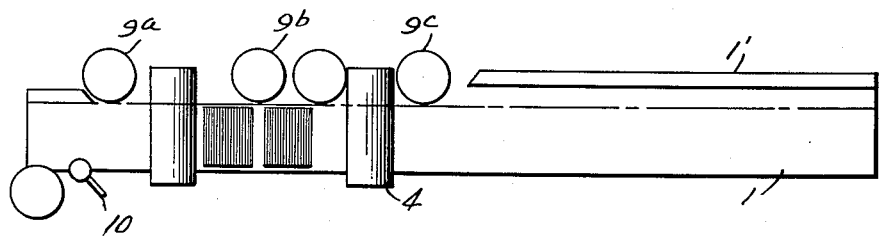
Fig. 8
INVENTOR:
Jaime Marba Oller
BY Ernest P. Marmorek,
His ATTORNEY.

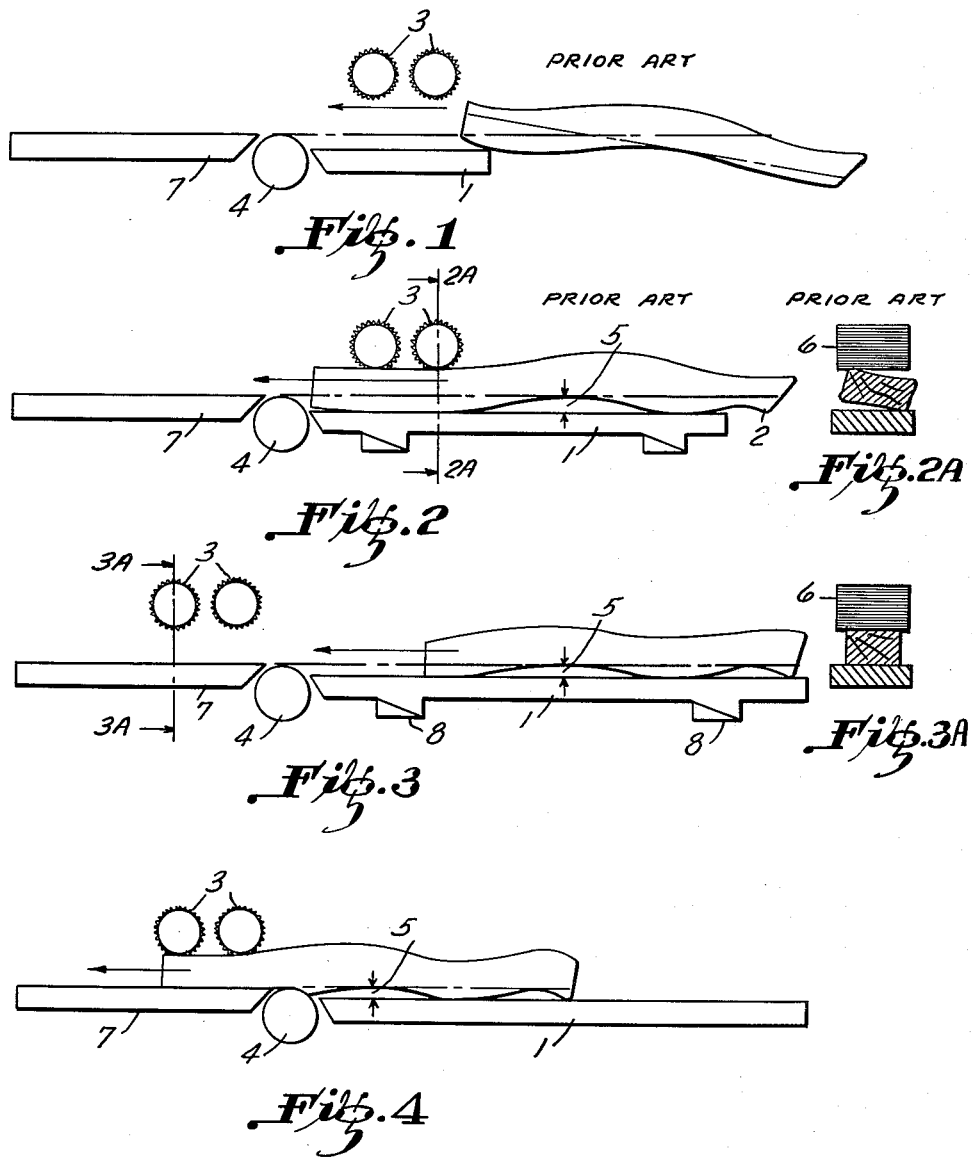

United States Patent Office 2,998,038
Patented Aug. 29, 1961

2,998,038
MULTI-SURFACE PLANING MACHINE
Jaime Marba Oller, Calle Cisterna 34 Municipio,
Tarrasa, Barcelona, Spain
Filed Jan. 5, 1959, Ser. No. 785,026
2 Claims. (Cl. 144—116)

The invention relates to planing machines, and relates more particularly to multi-surface planing machines.

The planing machines heretofore available were deficient therein that a board was fed to the machine rather than being drawn through the machine. That is, the feeding rolls were located before the cutters in relation to the direction of the movement of the board through the machine, rather than after. When the feeding rolls, while feeding the board to the planers, made contact with a warped portion of the board, the feeding rolls would tend to move the frontal portion of the board, at the time it was planed, in a lateral direction rather than hold it rigidly to pass it straight through the planers. This caused the planers to plane the wood in a warped or curved direction.

It is accordingly among the principal objects of the invention to provide a machine for feeding boards past a planer while each board is planed in a rigid and straight line without any deflecting or turning, irrespective of the shape of the wood gripped by the feeders.

Another object of the invention is to provide a means to plane more than one side of a board, at the same time, and to produce in one straight cut a finished moulded board.

With the above and other objects of the invention in view, the invention consists in the novel construction, arrangement and combination of various devices, elements and parts, as set forth in the claims hereof, certain embodiments of the same being illustrated in the accompanying drawings and described in the specification.

The foregoing and other objects of the invention will be best understood from the following description of exemplifications thereof, reference being had to the accompanying drawings, wherein:

FIG. 1 is a side elevational view of a planing machine of the prior art;

FIG. 2 is a more detailed side elevational and end view partly in section of the planing machine of the prior art shown in FIG. 1;

FIG. 2A is a sectional view taken on the line 2A—2A of FIG. 2;

FIG. 3 is a fragmentary side elevational and end view partly in section of the planing machine in accordance with an embodiment of the invention;

FIG. 3A is a sectional view taken on the line 3A—3A of FIG. 3;

FIG. 4 is a fragmentary side elevational view of the planing machine as shown in FIG. 3 in operation;

FIG. 5 is a fragmentary plan view of the planing machine embodying a modification;

FIG. 6 is a fragmentary plan view of the planing machine as shown in FIG. 5 in operation;

FIG. 7 is a fragmentary plan view of the planing machine as shown in FIG. 6 embodying another modification; and FIG. 8 is a fragmentary plan view of the planing machine shown in FIG. 7 embodying still other modifications.

FIGS. 1 and 2 show the prior art of a machine having a support 1 that supports a board 2 to be planed. The prior art shows the feeding means 3 placed before planers 4 in respect of the board feeding direction. The feeding means 3 will eventually make contact with the wrap or curvature 5 in the board, as shown in FIG. 2. When this happens, a lateral movement will be produced in the frontal portion of the board 2 being planed which will cause a lateral plane cut rather than a desired straight plane cut. In addition, if the board 2 is irregular as shown at 6 (FIG. 2a), it will also cause a lateral or rotational movement in the board 2 which will effect the final finished plane cut in the board.

In carrying the invention into effect in the embodiments which have been selected for illustration in FIGS. 3–10 of the accompanying drawings and for description in this specification, and referring now particularly to FIGS. 3 and 4, it can be seen that a feeding means or rolls 3 are placed after a first planer 4 in respect to the board feeding direction. A board 2 is therefore first placed on a first support 1, then directed through the first planer 4 which planes the bottom surface of the board. Then the board 2 is engaged and propelled by the rolls 3 past the planer 4 for the remaining planing operation.

The rolls 3 may be constructed of a planer and a driven feed roll, or two planers. That is, one roll may be a planer and the other a feed roll, or both rolls may be planers; any feed roll 3 may have cutting means to act also as a planer.

The rolls 3 are disposed opposite a second support 7 that is flat and engages the bottom surface of the board 2 that was planed by the first planer 4. In this manner, when the rolls 3 press against the board 2 frictionally, to draw it through the machine, the bottom surface of the board 2 moves on the flat support 7 and is pressed flat and parallel to the flat surface of the support 7 (FIG. 3A). At the same time, the first roll or both rolls 3 plane the top surface of the wood.

This arrangement assures that even a warped surface on the board 2 will not cause the board 2 to be shifted in a lateral direction.

The support 1 is adjustable in a vertical direction in relation to the support 7. This adjustment controls the final thickness of the finished board. Of course the maximum thickness of the board is defined by the maximum curvature of the board as shown at 5 and at 6. To adjust the vertical difference between the supports 1 and 7, a well known system of wedges, as shown at 8, is utilized. This system also keeps the support 1 parallel with the support 7. The support 7 need not be the adjustable support but support 1 may be adjustable in relation to support 7.

Due to the rolls 3 located after the first planer 4 the board is initially propelled by hand until it passes by the planer 4. The rolls 3 make contact with and move the board 2 through the machine after it is fed to it by hand. The rolls 3 will then continue to draw the board 2 through the machine.

Referring now to FIGS. 5 and 6, a vertical feed carriage 1' is shown which has an arrangement similar to that of the support 1. The board 2, disposed against the feed carriage 1' is fed until it is planed at the side, moving along carriage 1' by a first vertical planer 9 located near the rolls 3. The first vertical cutter planes the side surface of the board 2 at a 90° angle to the surfaces planed by planer 4 and rolls 3. The angle need not be 90° but may be any angle desired.

After the side surface is planed, the board 2 is propelled until it rests flat on another carriage 7'. This is done by the pressure exerted against the board 2 by a second vertical cutter 10 located opposite the vertical feed carriage 1', as shown in FIGS. 7 and 8. This second vertical cutter is also located after the first vertical cutter as in the case of the rolls 3 in relation to planer 4. The reason for this is again in that the second vertical cutter 10 also does the propelling through the machine and the pressure exerted by the second vertical cutter 10 against the board 2 in propelling it through the machine is transmitted between the flat surfaces of the newly planed side surface of the board and the side surface of the carriage 7'. In this way no lateral movement can be exerted by the second vertical cutter and damage the finished board as hereinbefore described.

The planing machine need not plane all the surfaces but may plane one or two surfaces by removing the other planers or cutters. Also the location of the planers and cutters need not be located as shown but may be placed in other locations as long as the essential elements of the invention are maintained. That is, the first planer 4 which has to plane the bearing surface shall be placed before the rolls 3, which engage the board 2 and exert pressure against it in order to move it through the machine. In addition the first vertical cutter 9 must be placed before the second vertical cutter for reasons brought out above. In FIG. 8 is shown that the first vertical cutter may be located at 9a, 9b, 9c or at 9d. All these positions are before the second vertical cutter 10. The second vertical cutter 10 may even be placed after the moulding cutters as shown in FIG. 10 as long as they are placed after the first vertcal cutter 9. The first vertical cutter 9 may be placed in any of the hereinafter mentioned positions but the best position may be to locate the first vertical cutter 9 at position 9b. Here the rolls 3 will help hold the board 2 when the board is planed by the first vertical cutter 9b.

The embodiment of this invention is best brought out when all the planers are used, that is, when a vertical and a horizontal pressure is exerted on the board to keep it travelling in a straight line through the machine. When only one surface is to be finished only one combination of cutters and feeders would be required.

The operation of planing four sides is as follows: The board 2 is fed from support 1 towards support 7. The board 2 makes contact with the first planer 4, which planes the bottom surface of the board 2. Next the first roll of the rolls 3 is contacted by the board 2, which roll may or may not start planing the top surface of the board, depending on whether the first roll acts as a driving roll or a planer and a driver roll as hereinbefore described. Once the first roll is in contact with the board 2 the forward movement is taken up by the first roll. This roll will frictionally engage the top surface of the board 2 and at the same time press it against the support 7. This will give the roll a positive grip on the board 2 to enable the roll to propel the board 2 through the machine. The board 2 will next make contact with the first vertical cutter 9 which cutter would make a side plane to the board 2 at 90° to the bottom planed surface. The board 2 will then travel on to the second of the rolls 3 which rolls shall continue pulling the board through the machine as they are planing the top surface of the board 2. Next the board 2 will make contact with the second vertical cutter 10. This cutter 10 will also frictionally engage the other side of the board 2 and at the same time plane and press it against the carriage 7'. This will give the cutter 10 a positive grip on the board 2 to enable the cutter 10 with the aid of the rolls 3 to propel the board 2 through the machine in a straight line. The board 2 will then travel through the machine in a straight line, at the same time being planed on four sides producing a finished board free from irregularities, warps or curvatures. The operation of the board going through the moulding cutters is the same as going through the hereinbefore described planers and need not be described.

Having thus described the invention, what I claim as new and desire to be secured by Letters Patent, is as follows:

1. A multi-surface planing machine, for use in machining boards fed in one direction through the machine, comprising in combination, a first planer operable to plane one surface of said board, a first support disposed in advance of said first planer and a flat second support disposed after said first planer, in respect of the board feeding direction, at least one of said supports being adjustable at right angle to said direction, said second support guiding said one surface after planing thereof, feeding means comprising at least one driven roll disposed opposite said second support and operable to engage frictionally the opposite surface of said board after the planing of the one side has commenced to draw the board past said first planer, and a vertical cutter located near said feeding means and having an axis at an angle to the axis of said first planer and operable to plane said board at an angle to said one surface.

2. A multi-surface planing machine, for use in machining boards fed in one direction through the machine, comprising in combination, a first planer operable to plane one surface of said board, a first support disposed in advance of said first planer and a flat second support disposed after said first planer, in respect of the board feeding direction, at least one of said supports being adjustable at right angle to said direction, said second support guiding said one surface after planing thereof, feeding means comprising at least one driven roll disposed opposite said second support and operable to engage frictionally the opposite surface of said board after the planing of the one side has commenced to draw the board past said first planer, a first vertical cutter located near said feeding means, the axis of said first vertical cutter being at an angle to the axis of said first planer, and operable to plane said board at an angle to said one surface, and a second vertical cutter located opposite said first vertical cutter.

References Cited in the file of this patent
UNITED STATES PATENTS

| | | |
|---|---|---|
| 227,223 | Doane et al. | May 4, 1880 |
| 393,238 | Johnson | Nov. 20, 1888 |
| 470,404 | Venn | Mar. 8, 1892 |
| 576,935 | Algren | Feb. 9, 1897 |
| 590,836 | Hayes | Sept. 28, 1897 |
| 677,243 | Luther | June 25, 1901 |
| 803,736 | Winters | Nov. 7, 1905 |
| 937,240 | Haldeman | Oct. 19, 1909 |
| 1,593,316 | Tetard | July 20, 1926 |
| 1,636,538 | Whipple | July 19, 1927 |
| 2,725,084 | Carlson | Nov. 29, 1955 |
| 2,819,744 | Chuet et al. | Jan. 14, 1958 |

FOREIGN PATENTS

| | | |
|---|---|---|
| 331,305 | Switzerland | Aug. 30, 1958 |